(12) United States Patent
Zhang et al.

(10) Patent No.: US 7,564,662 B2
(45) Date of Patent: Jul. 21, 2009

(54) OVERLOAD PROTECTION SYSTEM FOR AN ELECTROMAGNETIC LIFT

(75) Inventors: Xiaojun Zhang, Peoria, IL (US); Timothy Lynn Cooper, Metamora, IL (US); James Ivan Portscheller, Sparland, IL (US); Naga Raja Rao Mosam, Peoria, IL (US); Michael Lee Ferguson, Jr., Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 69 days.

(21) Appl. No.: 11/712,097

(22) Filed: Feb. 28, 2007

(65) Prior Publication Data

US 2008/0204948 A1 Aug. 28, 2008

(51) Int. Cl.
*H02H 7/06* (2006.01)
(52) U.S. Cl. .................. 361/20; 361/93.1; 361/139; 361/159; 361/160
(58) Field of Classification Search ............. 361/20, 361/93.1, 139, 159–160
See application file for complete search history.

(56) References Cited

U.S. PATENT DOCUMENTS

| 4,200,832 | A |   | 4/1980 | Johansson et al. |
| 4,937,561 | A | * | 6/1990 | Sasaki et al. ................. 340/646 |
| 5,206,776 | A |   | 4/1993 | Bodenheimer et al. |
| 5,390,068 | A |   | 2/1995 | Schultz et al. |
| 5,418,675 | A |   | 5/1995 | Bodenheimer et al. |
| 5,453,673 | A |   | 9/1995 | Yang |
| 5,497,332 | A |   | 3/1996 | Allen et al. |
| 5,528,445 | A |   | 6/1996 | Cooke et al. |
| 5,721,657 | A | * | 2/1998 | Griffiths et al. ............. 361/93.1 |
| 5,959,416 | A | * | 9/1999 | Clutter et al. ................ 318/141 |
| 6,701,221 | B1 |   | 3/2004 | Eaton et al. |
| 6,798,627 | B2 |   | 9/2004 | Schultz et al. |
| 6,842,118 | B2 | * | 1/2005 | Igarashi et al. .............. 340/665 |
| 7,102,313 | B2 | * | 9/2006 | Kadota et al. ................ 318/465 |
| 2001/0009363 | A1 |   | 7/2001 | Rice et al. |
| 2008/0043383 | A1 | * | 2/2008 | Shah et al. ..................... 361/20 |

FOREIGN PATENT DOCUMENTS

| GB | 2 149 597 | 6/1985 |
| JP | 2002211873 | 7/2002 |
| JP | 2002 348087 | 12/2002 |

* cited by examiner

*Primary Examiner*—Stephen W Jackson
*Assistant Examiner*—Terrence R Willoughby
(74) *Attorney, Agent, or Firm*—Finnegan, Henderson, Farabow, Garrett & Dunner (57) ABSTRACT

A method for protecting against current overload conditions associated with an electromagnetic lift system comprises receiving current data from a current monitoring device associated with an electromagnetic lift system. The method also includes determining a current level based on the collected current data, and identifying a predetermined overload range corresponding to the current level if the current level exceeds an overload current threshold. The method also includes monitoring a time that the current level is within the predetermined overload range, and providing a command signal to an actuator associated with the electromagnetic lift system if the time that the current level is within the predetermined overload range exceeds a predetermined time limit. The command signal causes the actuator to substantially limit mechanical power provided to a generator associated with the electromagnetic lift system.

19 Claims, 5 Drawing Sheets

| Current Level (as Percentage of Maximum Normal Current) | Time Limit (seconds) |
|---|---|
| 105-115% | 30 |
| 115-120 | 25 |
| 120-130 | 20 |
| 130-150 | 10 |
| 150-175 | 5 |
| >175 | 2 |

OVERLOAD PROTECTION SYSTEM FOR AN ELECTROMAGNETIC LIFT

TECHNICAL FIELD

The present disclosure relates generally to electronic overload protection systems and, more particularly, to an electronic overload protection system for equipment that employs electromagnetic lifts.

BACKGROUND

Electromagnetic lifts are used in a variety of industrial and commercial applications, such as those that require lifting and transporting large metallic objects. These electromagnets are typically powered by a DC generator. A motor drives the DC generator, which produces a magnetizing current to the coils of the electromagnetic device. The current induces a strong magnetic field on the face of the electromagnetic device, which can be used to lift and transport metallic or magnetic materials. In work environments that require the lifting and transport of heavy loads, electromagnetic lifts may require a substantially large current that is sufficient to induce a magnetic field strong enough to provide the required lift capacity.

Electromagnetic lifts may be employed in harsh environments (e.g., scrap yards, shipyards, or waste facilities) and/or may be subject to prolonged exposure to the elements. Consequently, electromagnetic lifts, and components and systems associated therewith, may be particularly vulnerable to damage and wear. For example, in material handling machines used in scrap yards, current produced by an on-board generator may be carried by an electrical cable along the boom of the material handler to the electromagnet attached to the end of the boom. Should the electromagnetic cable become damaged, cut, or shorted, a resulting current overload condition may potentially harm the generator set, the electromagnet, or the electronic control equipment.

Additionally, electromagnetic lifts typically include one or more operator-controlled switches that interrupt the current flow through the electromagnet, which causes the magnetic field to weaken quickly, thereby releasing objects held by the magnetic field. Due to the high current flow required to energize the electromagnet, operation of these switches may produce electrical arcing that can lead to premature wear of the switch contacts and/or conductors associated with the electromagnet, which, over time, may result in current overload conditions within the electromagnetic system.

One method used to mitigate the effects of current overload conditions in electromagnetic lift systems involves using a fuse in the electromagnetic circuit. When the current level in the electromagnetic circuit exceeds the current rating of the fuse, the fuse breaks the circuit, thereby preventing the flow of current within the circuit. While this may be useful in disabling the electromagnetic drive circuit when a minimum current threshold is exceeded, it may be lead to unnecessary equipment downtime and increased repair costs.

Moreover, it may be advantageous in certain situations to allow temporary operation of the electromagnetic lift at peak levels that may exceed the current rating of the fuse, for very short time periods. For instance, in lifting and transporting extremely large loads where extra weight capacity may be required, it may be advantageous to temporarily increase the output current of the generator to provide a boost in power to the electromagnet. However, should the power boost require an increase in current above the current rating of the fuse, the operator may risk blowing the fuse and disabling the machine. Thus, in order to provide overload current protection, without unnecessarily disabling the machine, an overload protection system capable of discriminating between electrical faults and temporary, deliberate current peaks may be required.

The presently disclosed overload protection system for electromagnetic lifts is directed toward overcoming one or more of the problems set forth above.

SUMMARY OF THE INVENTION

In accordance with one aspect, the present disclosure is directed toward a method for protecting against current overload conditions associated with an electromagnetic lift system. The method may include receiving current data from a current monitoring device associated with an electromagnetic lift system, and determining a current level based on the collected current data. The method may also include identifying a predetermined overload range corresponding to the current level if the current level exceeds an overload current threshold. A time that the current level is within the predetermined overload range is monitored, and a command signal may be provided to an actuator associated with the electromagnetic lift system if the time that the current level is within the predetermined overload range exceeds a predetermined time limit. The command signal may cause the actuator to substantially limit mechanical power provided to a generator associated with the electromagnetic lift system.

According to another aspect, the present disclosure is directed toward an overload protection system for an electromagnetic device. The system may comprise an electromagnet, a generator electrically coupled to the electromagnet and configured to energize the electromagnet, and an actuator configured to selectively couple a mechanical power source to the generator. The system may also include a controller configured to receive data indicative of the current flow associated with the generator and determine a current level based on the collected current data. The controller may also identify a predetermined overload range corresponding to the current level if the current level exceeds an overload current threshold. The controller may further monitor a time that the current level is within the predetermined overload range, and provide an interrupt command signal to the actuator if the time that the current level is within the predetermined overload range exceeds a predetermined time limit. The command signal causes the actuator to substantially limit mechanical power provided to a generator associated with the electromagnetic lift system.

In accordance with yet another aspect, the present disclosure is directed toward an overload protection system for an electromagnetic device comprising an electromagnet, a generator electrically coupled to the electromagnet and configured to energize the electromagnet, and a motor operatively coupled to the generator and configured to provide a power output. The system may also include an actuator associated with the motor and configured to selectively couple the power output of the motor to the generator, a monitoring device for collecting data indicative of the current flow associated with the generator, and a controller configured to determine a current level based on the collected current data. The controller may also identify a predetermined overload range corresponding to the current level if the current level exceeds an overload current threshold, and monitor a time that the current level is within the predetermined overload range. The controller may further provide an interrupt command signal to the actuator if the time that the current level is within the predetermined overload range exceeds a predetermined time limit. The interrupt command signal causes the actuator to de-couple the power output of the motor from the generator.

DETAILED DESCRIPTION

Figure 1:
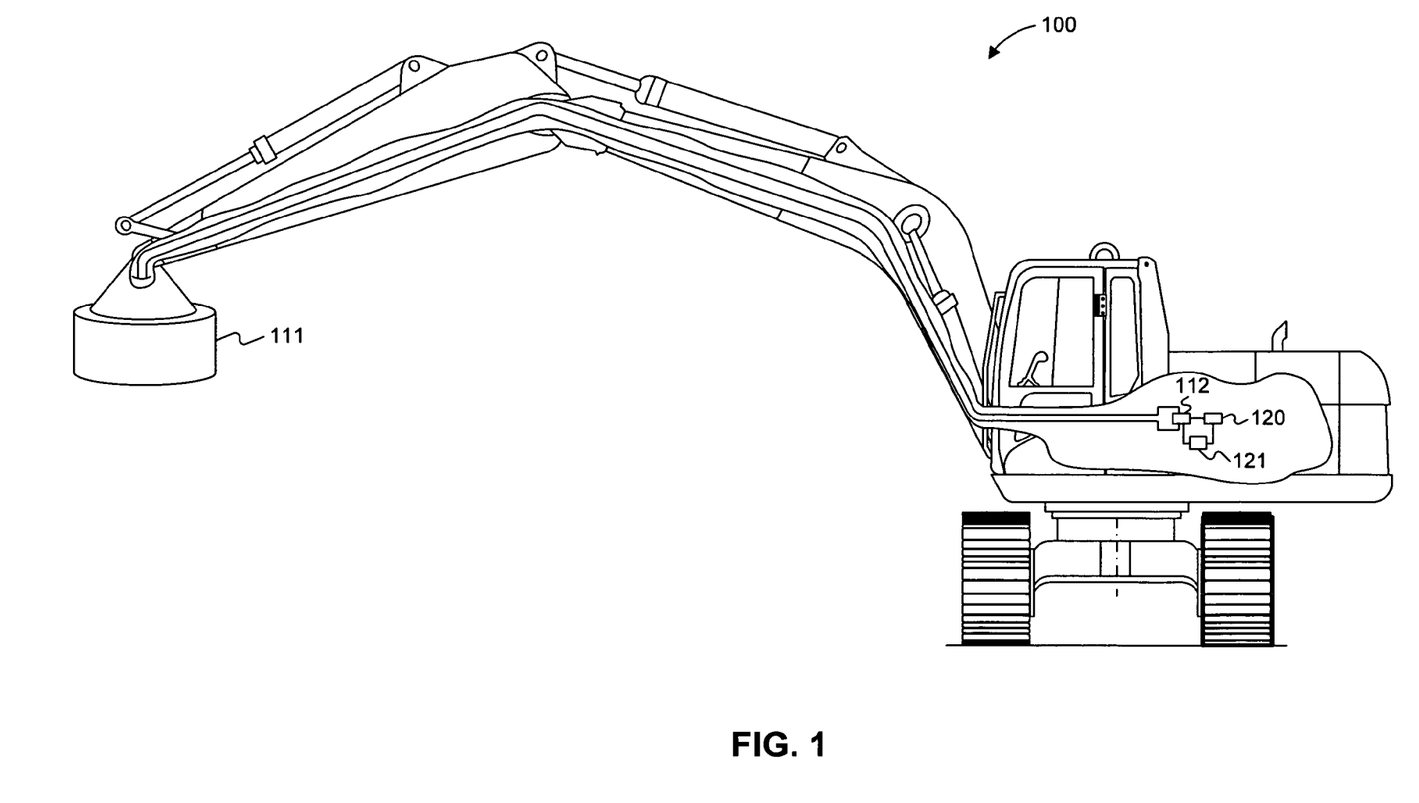
FIG. 1 illustrates a machine comprising an exemplary disclosed electromagnetic lift, in accordance with certain disclosed embodiments.

FIG. 1 illustrates a machine 100 that includes an exemplary disclosed overload protection system 110, in accordance with the disclosed embodiments. Machine 100 may be a fixed or mobile machine configured to perform an operation associated with a work environment. Thus, machine, as the term is used herein, refers to a fixed or mobile machine that performs some type of operation associated with a particular industry, such as mining, construction, farming, etc. and operates between or within work environments (e.g., construction site, mine site, power plants, etc.) Although machine 100 is illustrated as a material handler, it is contemplated that machine 100 may include any type commercial or industrial device that includes a generator-driven electromagnet such as, for example, an electromagnetically driven transportation system (e.g., levitation train), an electromagnetic welding device, or any other type of electromagnetic device.

Figure 2:
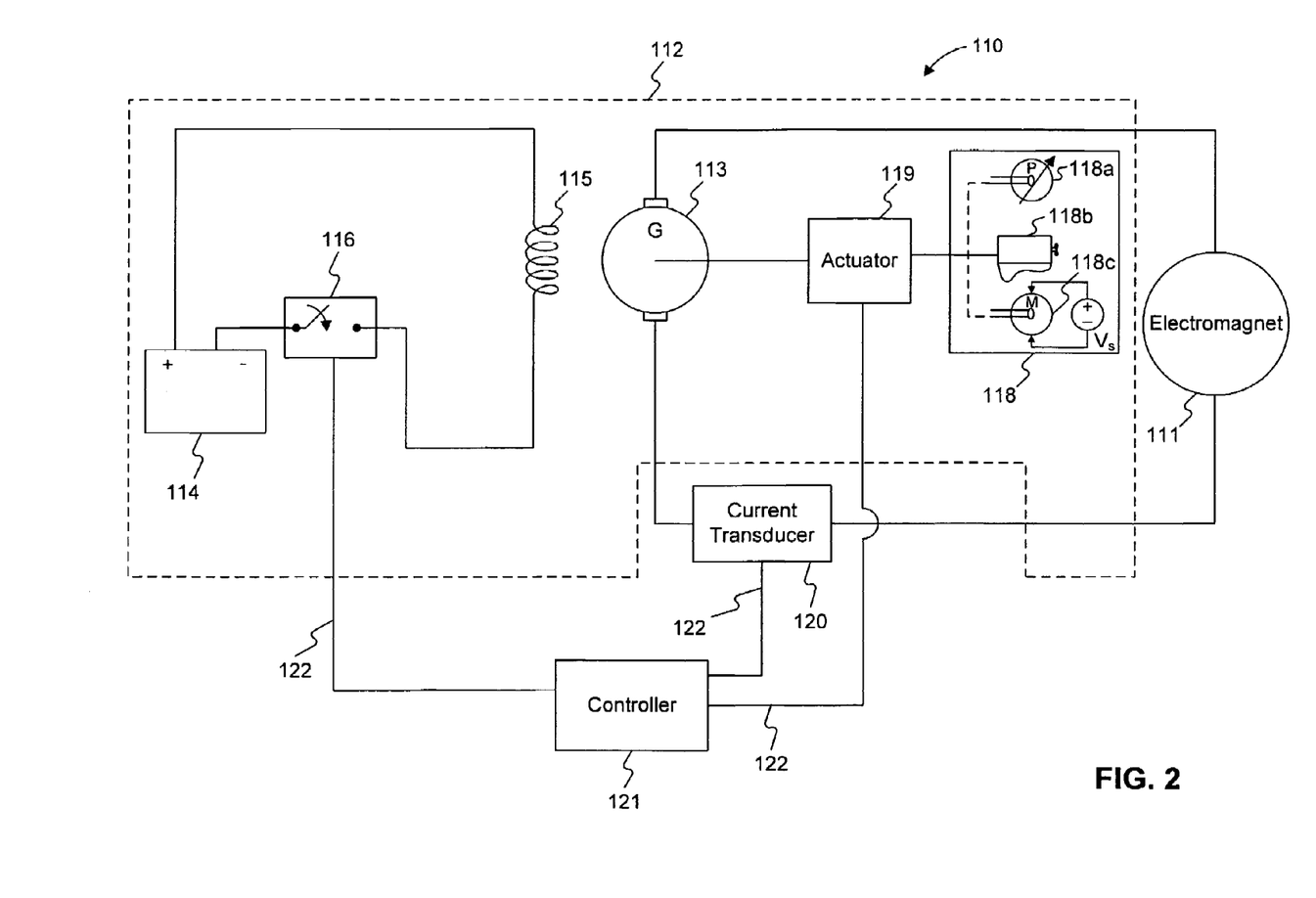
FIG. 2 provides a schematic illustration of an exemplary overload protection system for an electromagnetic lift system, in accordance with certain disclosed embodiments.

Overload protection system 110 may include a plurality of components that cooperate to generate a variable magnetic field for performing a task associated with an industrial or commercial work environment. According to one exemplary embodiment and as illustrated in FIG. 1, overload protection system 110 may embody an electromagnetic lift associated with machine 100. Overload protection system 110 may include an electromagnet 111, a generator set 112, a power monitoring device 120 for monitoring a power level associated with generator set 112, and a controller 121 for controlling one or more operational aspects associated with overload protection system 110. It is contemplated that overload protection system 110 may include additional, fewer, and/or different components than those listed above. FIG. 2 illustrates an exemplary overload protection system in accordance with the disclosed embodiments.

Electromagnet 111 may include any type of device adapted to receive electrical energy and generate a magnetic field in response to the received electrical energy. Electromagnet 111 may include one or more conductor coils (not shown) wound substantially around a ferromagnetic core (not shown). As current is passed though the conductor coils of the electromagnet, a magnetic field is generated in the ferromagnetic core. The strength of the magnetic field may be substantially proportional to the conductor coil current. Accordingly, the strength of the magnetic field may be adjusted by modifying a current level provided to the conductor coils of the electromagnet.

The shape and configuration of the electromagnet 111 may be determined based on the desired application of electromagnet 111. For electromagnetic lifts, for example, electromagnet 111 may be configured such that a majority of the magnetic field is concentrated substantially along a face of the electromagnet that will interface with a device to be lifted. It is contemplated, however, that other configurations and arrangements of electromagnet 111 may be implemented to affect the efficiency of overload protection system 110. Accordingly, the size, type, and arrangement of electromagnet 111 are exemplary only and not intended to be limiting.

Generator set 112 may include a plurality of components operable to provide power for energizing electromagnet 111. For example, generator set 112 may include a generator 113 and a power source 118 for driving generator 113. Generator set 112 may also include an actuator 119 for selectively coupling power source 118 to generator 113. Generator set 112 may include additional, fewer, and/or different components than those listed above. For example, generator set 112 may include one or more sensors, actuators, and/or controllers for monitoring and controlling one or more operational aspects associated with one or more components of generator set 112. Accordingly, the components listed above are exemplary only and not intended to be limiting.

Generator 113 may include any type of device that may be configured to convert at least a portion of mechanical energy into electrical energy. For example, in response to a mechanical power output supplied by power source 118, generator 113 may produce electrical energy that may be used to energize the conductor coils of electromagnet 111. According to one embodiment, generator 113 may include a DC generator or, alternatively, and AC generator coupled to a rectifier for converting at least a portion of the AC power output to a DC power output. Generator 113 may be configured to provide constant voltage output (e.g., 230V or any other suitable level) for energizing electromagnet 111.

According to an exemplary embodiment, generator 113 may include a separately-excited DC generator that includes one or more shunt coil 115 coupled to a separate power supply 114. Although FIG. 2 illustrates power supply 114 as a battery, it is contemplated that power supply 114 may include any type of suitable electrical power source such as, for example, a generator, a DC power source, a rectified AC power source, or any other suitable device for providing electric power output to energize a shunt field winding of a separately-excited DC generator. According to one embodiment, power supply 114 may be selectively coupled to shunt coil 115 via an electronic switch 116.

Electronic switch 116 may be operable to control the excitation of a field winding of the separately-excited DC generator, causing an interruption in the output power provided from generator 113. Electronic switch 116 may include any type of electrically- or electromechanically-actuated switching device that may be operated by controller 121. For example, electronic switch 116 may include a high-power semiconductor switching device (e.g., FET or BJT switch), an industrial relay switch, an electrically-actuated solenoid switch, or any other suitable switching device.

Power source 118 may include any device configured to provide mechanical a power output for rotating a shaft coupled to a rotor of generator 113. In one example, power source 118 may include a hydraulic pump/motor 118a that provides fluid flow to rotate a shaft coupled to the rotor of generator 113. In another example, power source 118 may be a combustion engine system 118b associated with machine 110, wherein a portion of the mechanical output generated by the engine is harnessed to rotate the rotor of generator 113.

According to yet another example, power source 118 may include an electric motor 118c coupled to a battery, fuel cell, or another suitable electric power source. The electric motor may be configured to rotate the shaft associated with the rotor of generator 113. It is contemplated that one or more suitable power sources may be selectively coupled to and configured to drive generator 113 to maintain the overall efficiency of machine 100. For example, a combustion engine 118b may be selectively coupled to generator 113 and configured to drive generator 113 during normal engine operating conditions. However, during periods of peak loading of the engine, causing the engine to operate below a desired efficiency, an electric motor 118c may be coupled to generator 113 to provide the mechanical output power required to drive generator 113.

Pump 118a may include any type of device operable to generate fluid flow for use in one or more hydraulic circuits. For example, pump 118a may include any suitable hydraulic pump such as a gear pump, a piston-type pump, a vane pump, or any other type of pump configured to generate a fluid flow. Pump 118a may be fluidly coupled to a hydraulic motor (not shown) that may be configured to rotate shaft coupled to generator 113. Pump 118a may generate fluid flow that drives a hydraulic motor, which may, in turn provide a torque output for turning a rotor of generator 113. Alternatively and/or additionally, pump 118a may be fluidly coupled to one or more other hydraulic devices or circuits for generating fluid flow for use in one or more hydraulic systems associated with the device or system. For example, in addition to producing fluid flow for driving generator 113, pump 118a may be coupled to one or more hydraulic circuits for operating a boom of machine 110.

Actuator 119 may include any type of electrical, mechanical, or electro-mechanical device that can be operated by controller 121. According to one embodiment, actuator 119 may be an electronically-controlled diverter valve that can be opened and closed by controller 121. When the valve is open, pump 118a may be fluidly coupled to a motor for driving generator 113. When the valve is closed, the flow of fluid between pump 118a and the motor may be prevented, with the fluid being bypassed to one or more other components that may be coupled to pump 118a. According to another embodiment, when power source 118 is an electric motor 118c, actuator 119 may be an electronic switch that can be operated to selectively couple an electrical power source $V_s$ to electric motor 118c. Thus, when operated, actuator 119 may couple and de-couple a power source $V_s$ from electric motor 118c. When power source $V_s$ is de-coupled from electric motor 118c, the motor may not provide the mechanical output necessary to operate generator 113 that provides the electrical power to energize electromagnet 111. When power source $V_s$ is coupled to electric motor 118c, the motor provides the torque required to rotate the shaft of generator 113, which, in turn, provides the electrical energy necessary to energize electromagnet 111. Thus, it is contemplated that actuator 119 may include any suitable device for selectively limiting mechanical power provided to a generator associated with the electromagnetic lift system.

Monitoring device 120 may include any type of device operable to detect a power level associated with overload protection system 110 and provide an output indicative of the detected power level to controller 121. For example, monitoring device 120 may include a current monitoring device such as, for example, a current transducer or Hall effect device, an ammeter, magneto-resistive current sensor, or any other suitable current monitoring device. Monitoring device 120 may measure a power level of the system and provide an output signal corresponding to the detected power level. Alternatively and/or additionally, monitoring device may include any suitable device for measuring power-related features of overload protection system 110 such as, for example, devices for measuring impedance, voltage, resistance, temperature, or any other parameter that may be associated with a power level of the system.

Although monitoring device 120 is illustrated as a power monitoring device, it is contemplated that additional and/or different monitoring devices may be used to measure other operational aspects associated with machine 110 and/or overload protection system 120. For example, one or more monitoring devices may be coupled to one or more of generator 113, power source 118, or any other component associated with overload protection system 120. Each monitoring device may be configured to monitor an operational aspect of the particular component that it is associated with. Monitoring device 120 may include any type of sensor and may be adapted to monitor one or more operational aspects associated with an equipment system such as, for example, temperature, pressure, vibration, noise, fluid flow rate, or any other aspect associated with machine 100 or any components or subsystems associated therewith.

For example, at least one monitoring device may be adapted as a pressure sensor that may be coupled to pump 118a to monitor the pressure of the fluid associated with pump 118a. In another example, at least one monitoring device may include a temperature sensor associated with one or more of generator 113 or power source 118 to monitor a stator, rotor, or conductor temperature of the device(s). In yet another example, monitoring device 120 may include a noise or vibration sensing device for monitoring bearing noise associated with generator 113 or power source 118. Monitoring device 120 may transmit the measured data to controller 121 immediately upon collection of the measured data. Alternatively, monitoring device 120 may store the measured data in memory and provide the measured data in response to a data request from controller 121.

Controller 121 may include a device for collecting, processing, analyzing, recording, and transmitting data associated with overload protection system 110 or components and subsystems associated therewith. Controller 121 may also be configured to control one or more operational aspects associated with components and subsystems of machine 110. According to one embodiment, controller 121 may include an electronic control module (ECM) associated with machine 100. Alternatively and/or additionally, controller 121 may include a control system dedicated exclusively to overload protection system 110. Controller 121 may be configured to collect data indicative of the power level associated with overload protection system 121 and control one or more aspects associated with machine 100, in response to the collected data.

Controller 121 may include one or more components for collecting, processing, and storing data associated with overload protection system 110. Controller 121 may include, among other things, a processor (not shown), volatile and/or non-volatile memory (e.g., RAM, ROM) (not shown), one or more storage devices (not shown), and one or more communication devices for communicating data with components and subsystems associated with overload protection system 110. It is contemplated that controller 121 may include additional, fewer, and/or different components than those listed above. Thus, the components listed above are exemplary and not intended to be limiting.

Controller 121 may be communicatively coupled to one or more components associated with overload protection system 110. For example, controller 121 may be coupled to one or more of electronic switch 116, actuator 119, and monitoring device 120 via communication lines 122. Controller 121 may be configured to communicate with one or more components of overload protection system 110 over communication lines 122. It is contemplated that controller 121 may be communicatively coupled to additional, fewer, and/or different components than those listed above.

Controller 121 may be configured to receive data from monitoring device 120 and operate one or more of electronic switch 116 and actuator 119 based on the received data. As explained above, controller 121 may include a storage device that includes one or more threshold values (e.g., limits, ranges, etc.) associated with a power level associated with overload protection system 110. Threshold values may include, for example, current or voltage threshold ranges associated with predetermined acceptable limits of current levels associated with overload protection system 110. Alternatively and/or additionally, threshold values may include temperature limits (e.g., associated with generator 113, power supply 114, power source 118, and/or electromagnet 111), pressure limits (e.g., associated with pump 118a), vibration limits, noise limits, or limitations to any other parameter that may cause damage to machine 100 or any of its constituent components. Controller 121 may receive/collect operation data from monitoring device 120 and compare the collected data to the predetermined threshold values. If the received data is inconsistent with the threshold value(s), controller 121 may operate one or more of electronic switch 116 and actuator 119 to shut down a portion of the system and mitigate the potentially damaging effects of an overload condition.

According to an exemplary embodiment, controller 121 may be configured to identify the presence of a current overload condition associated with an electromagnetic device, determine whether the presence of the current overload condition exceeds a predetermined time period, and shut down generator set 112 if the current overload condition persists for longer than the predetermined time period. For example, overload protection system 110 may include control software that, when executed by a processor, may compare current data received from monitoring device 120 with predetermined current threshold ranges. If the current level falls within an overload range, the software may initialize a timer to record the time that the operation data is within the range. If the current level is within the overload range for more than a predetermined time limit, controller 121 may transmit a control signal that shuts down generator set 112 until the overload condition subsides. Operation of controller 121 and software associated therewith will be described in greater detail below.

Upon detecting an overload condition, controller 121 may be configured to provide a warning signal to a user interface console. For example, controller 121 may provide a warning signal to an operator of the electromagnetic device if the current level exceeds an overload current threshold (e.g., if the current is greater than a normal current level associated with the system). The warning signal may include an audible warning signal, a visual warning signal, and/or a combination of audible and visual warning signals. According to one embodiment, controller 121 may provide a silent warning signal (e.g., a blinking warning lamp) if the time that the current level is within the predetermined overload range is less than a warning threshold level. Alternatively and/or additionally, controller 121 may provide an audible warning signal (e.g., an audible alarm) if the time that the current level is within the predetermined overload range is greater than a warning threshold level.

Figure 3:
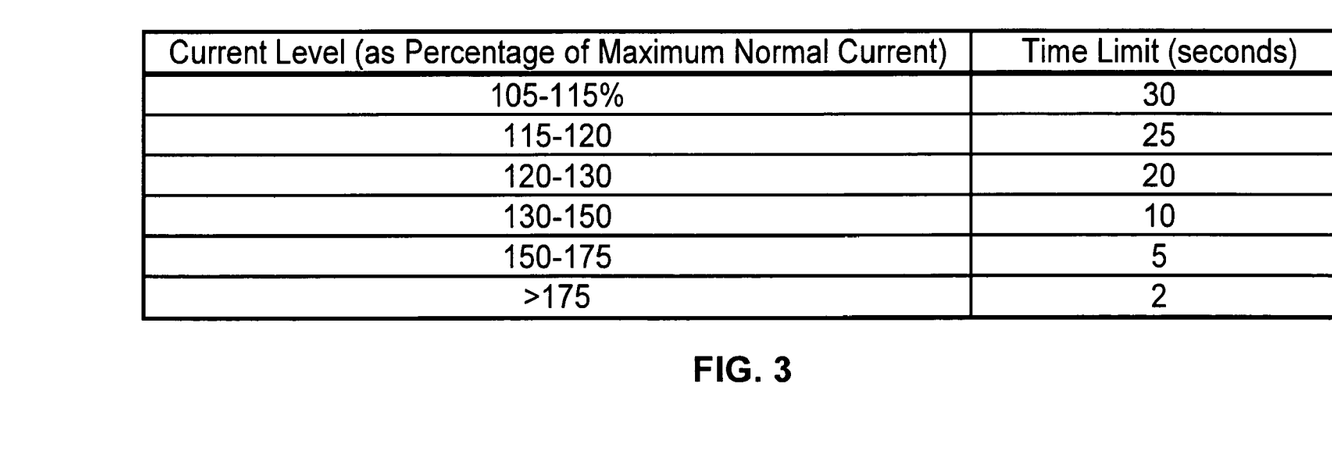
FIG. 3 illustrates exemplary current threshold ranges and time limits that may be used with the overload protection system of FIG. 2.

FIG. 3 illustrates exemplary predetermined threshold ranges associated with overload protection system 110. According to one embodiment, and as illustrated in FIG. 3, predetermined threshold ranges may be expressed as a predetermined percentage of a nominal or "normal" current level of the system. For instance, if generator 113 produces a constant DC voltage output and the resistance of the devices in a particular circuit are known, the expected nominal current through the system can be determined using Ohm's law as $I=V/R$. Thus, an overload condition may exist if the current exceeds the normal, expected current for the system (i.e., the current level is greater than 100% of the maximum normal current). Those skilled in the art will recognize that, for constant output voltage, overload conditions may result from line faults (e.g., arcing due to the reversal of electromagnetic field required release objects, shorts in the system due to damaged or worn conductors, etc.), from the addition of current injected into the system that is stored in the electromagnetic field, or from normal wear associated with the electromagnet. The number of ranges and the particular values associated with each range are exemplary only. Accordingly, additional, fewer, and/or different ranges may be substituted without departing from the scope of the present disclosure.

As illustrated in FIG. 3, each current threshold range may correspond to a particular time limit. Time limits may be predetermined based on, for example, a particular industry standard related to the appropriate operation of electromagnetic devices. Alternatively and/or additionally, time limits may be established by the current tolerances associated with one or more other components of overload protection system. For example, one or more time limits may be programmed to limit the strength of the electromagnetic field generated by electromagnet 111. The time limit(s) may be programmed by a user (e.g., a technician) or manufacturer, and may be re-programmable by the user. It is contemplated that additional, fewer, and/or different time limits may be implemented. Accordingly, time limits depicted in FIG. 3 are exemplary only and not intended to be limiting.

Figure 4A:
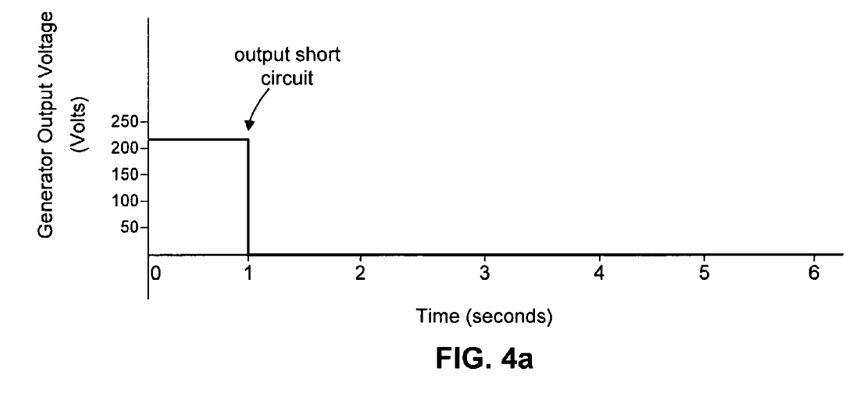
FIGS. 4a and 4b provide exemplary voltage and current responses to a fault condition associated with the overload protection system of FIG. 2.
Figure 4B:
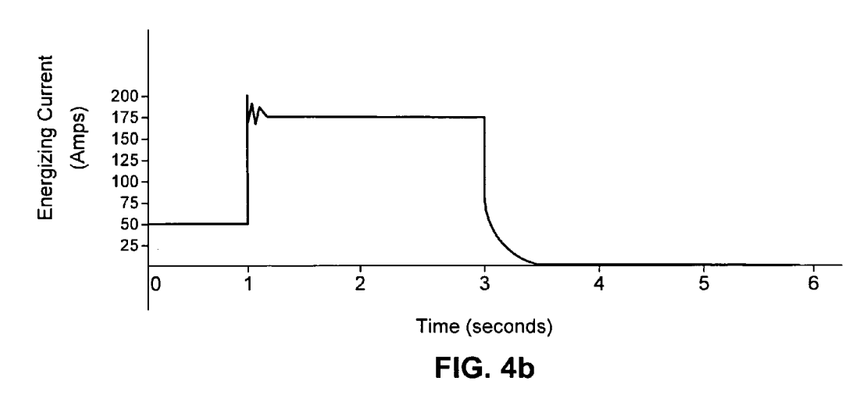

FIGS. 4a and 4b provides empirical data associated with operation of overload protection system 140. FIG. 4a illustrates an exemplary fault condition associated with a short circuit on the generator output. Short circuit conditions may be a result of damage to the conductors associated with electromagnet 111 such as, for example, faulty energizing coils of electromagnet 111 or damage to the power cables that transport output power from generator set 112 to electromagnet 111. As illustrated in FIG. 4a, before the short-circuit test condition is provided (at time=1 second), generator 113 provides a "normal" output voltage of 230 volts. At t=1 second, the output of generator 113 is shorted, simulating a fault condition on overload protection system 110 and producing an abrupt increase in output current.

FIG. 4b provides a graph illustrating generator output current in response to the short circuit condition shown in FIG. 4a. Prior to the short circuit condition, current output of the generator remains relatively stable at the normal operating current of approximately 50 A. At time=1 second, generator output current spikes above 175 A (approximately 350% of normal operating current) resulting from the short circuit on the generator output. Upon detection of the increased current level, overload protection system 110 may establish a time limit of 2 seconds (corresponding to the predetermined time limit of the chart in FIG. 3). As explained, this time limit may allow temporary transient currents or peak current associated with operator boosts sufficient time to return to normal operating levels. Should the current level fail to return to the normal level after 2 seconds, overload protection system 110 may operate actuator 119 (e.g., at time=3 seconds), thereby shutting down mechanical power to the generator and preventing generator from providing any additional magnetizing current to electromagnet 111. Accordingly, the generator output current weakens dramatically, as does the potential for damage to controller 121 or other components associated with machine 100. By shutting down the generator to reduce elevated current levels, overload protection system may limit additional transient current spikes that may be associated with operating conventional circuit interrupting devices, resulting in a relatively stable reduction in output current. FIG. 4b is exemplary only and not intended to be limiting.

Figure 5:
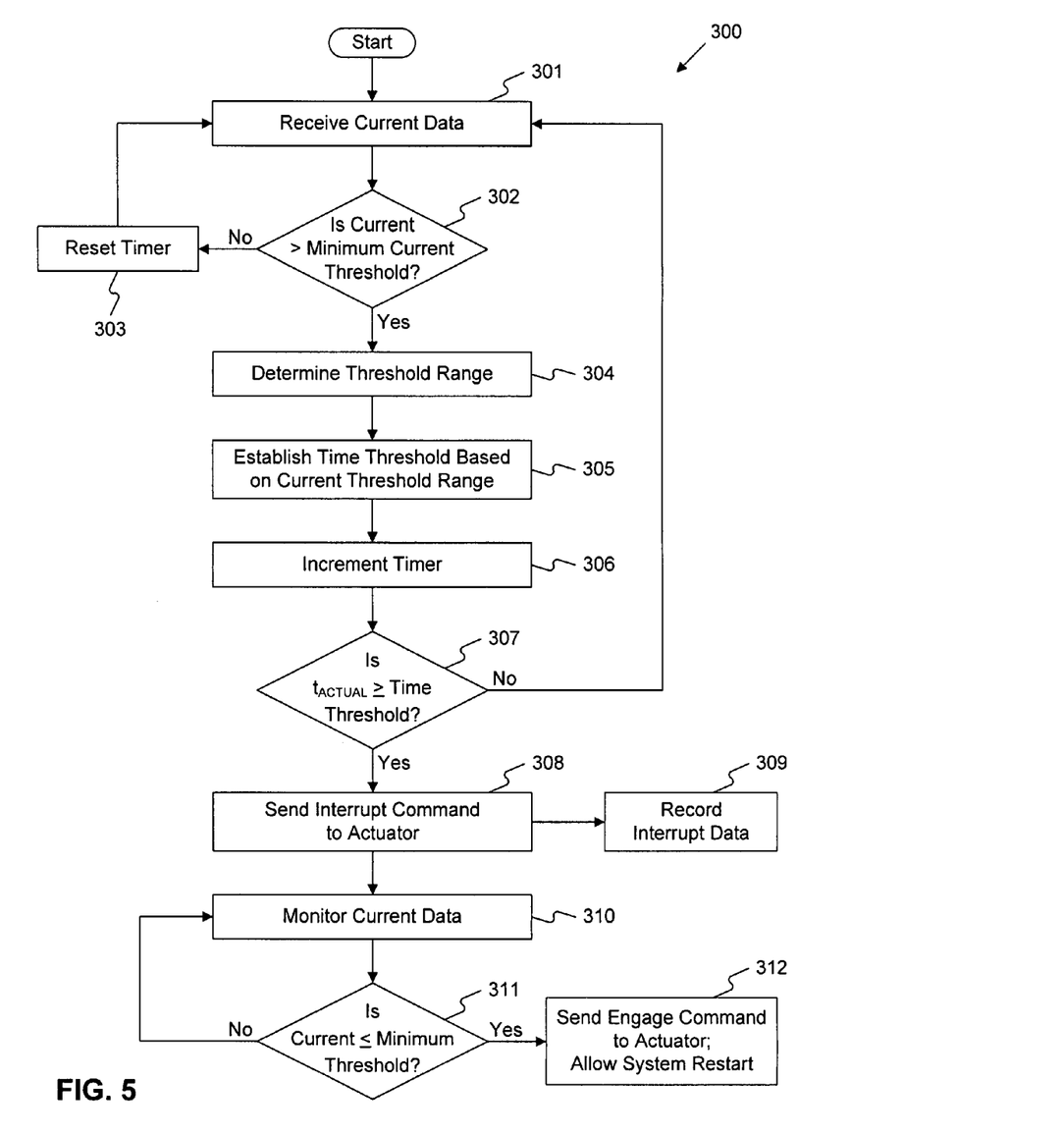
FIG. 5 provides a flowchart depicting an exemplary disclosed control method associated with the overload protection system of FIG. 2.

Processes and methods consistent with the disclosed embodiments may protect systems that use electromagnets from current overload conditions often associated with electromagnetic systems. The features and methods associated with the presently disclosed overload protection system may also provide protection schemes that may limit equipment downtime resulting from the detection of an overload condition. FIG. 5 provides a flowchart 300 depicting an exemplary method for protecting against current overload conditions associated with electromagnetic system.

As illustrated in FIG. 5, current data associated with the electromagnetic system may be received by overload protection system 110 (Step 301). For example, monitoring device 120 may collect data indicative of a current flowing through a circuit comprising generator set 112 and electromagnet 111. Monitoring device 120 may transmit the collected current data to controller 121 for processing and analysis.

Once the data indicative of the current level associated with the electromagnetic system has been received, controller 121 may compare the received current data with a minimum current threshold to determine if an overload condition exists (Step 302). According to one embodiment, a minimum current threshold may be established as 100% of the maximum normal current of the system. In some cases, the minimum current threshold may be established at a value slightly higher than 100% of the normal current (e.g., 105%) to allow for minor fluctuations of the current level without detecting an overload condition, thereby limiting nuisance faults related to instantaneous current spikes. If the current level is not greater than the minimum current threshold (Step 302: No), controller 121 may reset a timer that counts the time that an overload condition is present in the system (Step 303).

If, on the other hand, the current is greater than the minimum current threshold (Step 302: Yes), indicating that an overload condition may exist on the system, controller 121 may identify the threshold range that corresponds to the data indicative of the current level of the system (Step 304). For example, controller 121, may compare the received current data with a plurality of predetermined current ranges stored in memory, and identify the appropriate predetermined range.

Based on the identified predetermined current range, controller 121 may set a time threshold based on a predetermined time limit corresponding to the current threshold range (Step 305). For example, as illustrated in FIG. 5, if the measured current level is 127% of the maximum normal current, controller 121 may identify the current range of 120-130% and set the time limit that the current can remain within that range at 20 seconds.

Once the time limit has been established, controller 121 may cause the timer to begin counting (Step 306). According to one embodiment, controller 121 may be configured to operate on a synchronous cycle. The controller may increment a counter once per cycle, for each cycle that the current level is within a particular threshold range. The cycle may then be repeated at a particular rate. This rate may be synchronized such that the increments of the counter occur substantially every second. Thus, in accordance with one aspect, timer, as the term is used herein, refers to a synchronous counting device that can be incremented by controller 121, wherein the count cycle may be repeated once per second.

Controller 121 may compare the value of the timer with the time limit associated with the predetermined current threshold (Step 307). If the value of the timer is less than the time threshold (Step 307: No) associated with the monitored current level, overload protection system 120 may continue to monitor the current data associated with the system. Alternatively and/or additionally, if the value of timer is greater than the time limit associated with the monitored current level (Step 307: Yes), controller 121 may generate and transmit an interrupt command signal to one or more of actuator 119 or electronic switch 116 (Step 308). As previously explained, the interrupt command signal may cause actuator 119 operate, thereby preventing power source 118 from driving generator 113. Alternatively and/or additionally, the interrupt command signal may cause electronic switch 116 to disconnect the power supply from the shunt winding of the separately excited generator 113, which may reduce the output power that generator 113 supplies to electromagnet 111. Optionally, controller 121 may record data associated with the interrupt command (e.g., current level, the transmission time of the interrupt signal, etc.) for future fault analysis (Step 309).

Once an interrupt command signal has been transmitted to one or more of actuator 119 or electronic switch 116, overload protection system 120 may continue to monitor the current data (Step 310). Controller 121 may compare the current level with the minimum current threshold (e.g., 105%) (Step 311). If the current level is greater than the minimum current threshold (Step 311: No), indicating that that an overload condition is still present on the system, controller 121 may continue to monitor the current level. If, on the other hand, the current level is less than the minimum current threshold (Step 311: Yes), indicating that the overload condition has dissipated, controller 121 may clear the interrupt command, thereby enabling actuator 119 or electronic switch 116 to re-engage, allowing the electromagnetic system to restart (Step 312).

INDUSTRIAL APPLICABILITY

Although the disclosed overload protection system is discussed in connection with electromagnetic lifts for commercial and industrial machinery, it may be implemented in any type of system that requires overload protection in powering and operating any type of electromagnetic device. Moreover, although the system and methods disclosed herein are discussed in connection with preventing current overload conditions associated with electromagnetic systems, they may be used to monitor one or more other operational aspects associated with an electromagnetic system (or any components associated therewith), determine that an overload condition exists associated with a particular operational aspect, and take appropriate action to mitigate the potentially damaging effects of the overload condition, without causing undue equipment downtime.

The presently disclosed overload protection system and associated methods may have several advantages. First, because the overload protection system allows the generator set and electromagnet to operate under certain overload conditions for predetermined time limits, overload protection system 110 may not require a reduction in system performance, as compared with certain conventional systems that limit the power provided to the load immediately on detection of an overload condition. As a result, the presently disclosed overload protection system allows the electromagnetic system to operate outside of the normal operating ranges in certain circumstances, without a reduction or interruption in performance.

In addition, the presently disclosed overload protection system may increase equipment productivity. For example, because the disclosed overload protection system may not require fuses or circuit breaking devices to eliminate overload current conditions, downtime due to repairing, replacing, and/or re-setting these types of devices may be reduced and/or eliminated. In fact, in the event of persistent or prolonged overload conditions, the presently disclosed system may only require temporary system shutdown until the overload condition dissipates. As a result, the machine may return to service soon after the overload condition subsides, without requiring costly and time-intensive labor to repair fuses or other circuit breaking devices.

It will be apparent to those skilled in the art that various modifications and variations can be made to the presently disclosed overload protection system for electromagnetic lifts. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for protecting against current overload conditions associated with an electromagnetic lift system that includes an actuator selectively coupling a mechanical power source to a generator associated with the electromagnetic lift system and an electronic switch for selectively coupling a shunt winding of the generator to a power supply, the method comprising:
   detecting a current overload condition associated with an electromagnetic lift system; and
   providing a command signal to at least one of the actuator and the electronic switch associated with the electromagnetic lift system in response to the detected overload condition;
   wherein the command signal causes the at least one of the actuator and the electronic switch to limit power provided to a generator associated with the electromagnetic lift system.

2. The method of claim 1, wherein the actuator includes a mechanical device configured to selectively interrupt a mechanical power output provided to the generator by the mechanical power source.

3. The method of claim 2, wherein the power source includes a hydraulic pump operatively coupled to the generator, and the actuator includes a valve configured to control a flow of fluid associated with the hydraulic pump, wherein the command signal is configured operate the valve to limit power provided to a generator.

4. The method of claim 1, wherein detecting a current overload condition associated with the electromagnetic lift system includes:
   receiving current data from a monitoring device associated with the electromagnetic lift system;
   determining a current level based on the collected current data;
   identifying a predetermined overload range corresponding to the current level if the current level exceeds an overload current threshold; and
   monitoring a time that the current level is within the predetermined overload range.

5. The method of claim 4, further including providing a warning signal if the current level exceeds the overload current threshold.

6. The method of claim 1, wherein the actuator is disposed between the mechanical power source and the generator.

7. An overload protection system for an electromagnetic device, comprising:
   an electromagnet;
   a generator electrically coupled to the electromagnet and configured to energize the electromagnet;
   an actuator configured to selectively couple a mechanical power source to the generator;
   an electronic switch electrically coupled to a controller, the electronic switch configured to selectively couple a shunt winding of the generator to a power supply;
   the controller, configured to:
      detect a current overload condition associated with the electromagnet; and
      provide an interrupt command signal to one or more of the actuator and the electronic switch in response to the detected overload condition;
      wherein the command signal causes the one or more of the actuator and the electronic switch to limit power provided to the generator.

8. The overload protection system of claim 7, further including a monitoring device for collecting data indicative of a current level associated with the generator.

9. The overload protection system of claim 8, wherein the monitoring device includes a current transducer, electrically coupled to the overload protection system and further configured to provide the collected current data to the controller.

10. The overload protection system of claim 7, wherein the mechanical power source includes a hydraulic pump and the actuator includes a valve configured to control a flow of fluid associated with the hydraulic pump.

11. The overload protection system of claim 7, wherein the mechanical power source includes an internal combustion engine and the actuator includes a solenoid configured to engage a shaft of the engine to the generator.

12. The overload protection system of claim 7, wherein the mechanical power source is an electric motor and the actuator is an electric switch configured to selectively couple a mechanical power output of the electric motor to the generator.

13. The overload protection system of claim 7, wherein detecting the current overload condition includes:
   receive data indicative of a current flow associated with the generator;
   determine a current level based on the collected current data;
   identify a predetermined overload range corresponding to the current level if the current level exceeds an overload current threshold; and
   monitor a time that the current level is within the predetermined overload range.

14. The overload protection system of claim 13, wherein the controller is further configured to provide a warning signal if the current level exceeds the overload current threshold.

15. The overload protection system of claim 13, wherein the predetermined overload range includes a plurality of overload ranges, each overload range corresponding to a particular time limit that the current level can remain within the respective overload range before the controller provides the interrupt command signal.

16. The overload protection system of claim 7, wherein the controller is further configured to operate the electronic switch if the time that the current level is within the predetermined overload range exceeds a predetermined time limit.

17. An overload protection system for an electromagnetic device, comprising:
- an electromagnet;
- a generator electrically coupled to the electromagnet and configured to energize the electromagnet;
- a power source operatively coupled to the generator and configured to provide a mechanical power output;
- an electronic switch electrically coupled to a controller, the electronic switch configured to selectively couple a shunt winding of the generator to a power supply;
- an actuator associated with the power source and configured to selectively couple the power output of the power source to the generator;
- a monitoring device for collecting data indicative of a current flow associated with the generator; and
- the controller, configured to:
   - determine a current level based on the collected current data;
   - identify a predetermined overload range corresponding to the current level if the current level exceeds an overload current threshold;
   - monitor a time that the current level is within the predetermined overload range; and
   - provide an interrupt command signal to one or more of the actuator or the electronic switch if the time that the current level is within the predetermined overload range exceeds a predetermined time limit;
   - wherein the interrupt command signal causes the one or more of the actuator and the electronic switch to limit power provided to the generator.

18. The overload protection system of claim 17, wherein the controller is further configured to provide a warning signal if the current level exceeds the overload current threshold.

19. The overload protection system of claim 17, wherein the predetermined overload range includes a plurality of overload ranges, each overload range corresponding to a particular time limit that the current level can remain within the respective overload range before the controller provides the interrupt command signal.

* * * * *